United States Patent [19]
Franklin et al.

[11] Patent Number: 6,055,518
[45] Date of Patent: Apr. 25, 2000

[54] SECURE AUCTION SYSTEMS

[75] Inventors: Matthew K. Franklin, New York, N.Y.; Michael K. Reiter, Raritan, N.J.

[73] Assignee: AT&T Corporation, New York, N.Y.

[21] Appl. No.: 08/745,717

[22] Filed: Nov. 12, 1996

Related U.S. Application Data

[60] Provisional application No. 60/010,993, Feb. 1, 1996.

[51] Int. Cl.[7] .............................. G06F 19/00; H04L 9/00
[52] U.S. Cl. .................................. 705/37; 705/64; 705/67
[58] Field of Search .................................. 705/37, 64, 67; 380/4, 21, 23, 25, 30, 33

[56] References Cited

U.S. PATENT DOCUMENTS

| | | | |
|---|---|---|---|
| 4,996,711 | 2/1991 | Chaum | 380/30 |
| 5,511,121 | 4/1996 | Yacobi | 380/24 |
| 5,625,692 | 4/1997 | Herzberg et al. | 380/21 |
| 5,668,878 | 9/1997 | Brands | 380/30 |
| 5,708,714 | 1/1998 | Lopez et al. | 380/25 |
| 5,749,785 | 5/1998 | Rossides | 463/25 |

*Primary Examiner*—Allen R. MacDonald
*Assistant Examiner*—Penny Caudle
*Attorney, Agent, or Firm*—Kenyon & Kenyon

[57] ABSTRACT

The apparatus and method of the present invention provide secure auction service for use in a network having servers and bidding terminals. The auction service makes transactions among servers and bidding terminals subject to a distributed protocol. The distributed protocol distributes submitted bids among the multiple servers, closes a bidding period, verifies validity of monetary value of each submitted bid by utilizing said distributed protocol and determines a winning bidder.

17 Claims, 4 Drawing Sheets

$$400 \begin{cases} B \xrightarrow{A} G: \quad \text{aid}, \{\langle sh_j(B||v_\$||w_\$)||\text{aid}\rangle_{K_j}\}_{S_j \in G} \\ V\Sigma S\text{-pub}(\sigma_{\text{bank}}(v_\$)), \\ \{\langle V\Sigma S\text{-priv}_j(\sigma_{\text{bank}}(v_\$))\rangle_{K_j}\}_{S_j \in G} \end{cases}$$

$402 \quad S_j \xrightarrow{A} G: \quad \text{aid, close}$ $404 \quad \text{aid}, \{c_{j,l}\}_{S_j \in G}, \text{pub}_l, \{\text{priv}_{j,l}\}_{S_j \in G}$ $$406 \quad s_{i,l} = \begin{cases} s & \text{if } \langle c_{i,l}\rangle_{K_i^{-1}} = s||\text{aid} \\ \perp & \text{otherwise} \end{cases}$$

$408 \quad S_i \longrightarrow G: \quad \text{aid}, \{s_{i,l}\}_{1 \leq l \leq L}$ $410 \quad \text{aid}, \{s_{j,l}\}_{1 \leq l \leq L}$ $412 \quad S_i \xrightarrow{R} G: \quad \text{aid}, \{V\Sigma S\text{-stat}_{i,l}\}_{1 \leq l \leq L'}$ $414 \quad S_i \longrightarrow B: \quad \text{aid}, B, \sigma_{S_i}(\text{aid}||B)$ $$(M1') \quad B \xrightarrow{A} G: \quad aid, \ \{\langle sh_j \ (h(r)\|v_\$\|w_\$)\|aid \rangle_{K_j}\}_{S_j \in \mathcal{G}},$$

$$V\Sigma S - \text{pub}(\sigma_{\text{bank}}(v_\$)),$$

$$\{\langle V\Sigma S - \text{priv}_j \ (\sigma_{\text{bank}}(v_\$))\rangle_{K_j}\}_{S_j \in \mathcal{G}}$$

SECURE AUCTION SYSTEMS

This application claims the benefit of Provisional Application No. 60/010,993 filed Feb. 1, 1996.

BACKGROUND OF THE INVENTION

This invention relates to distributed services. More particularly, the invention relates to secure auction services.

Technology has replaced many human procedures with electronic ones. Unfortunately, much of the tradition, culture, and law that has been developed to provide protection in human procedures cannot readily be adapted to afford the same protection in electronic procedures. The study of cryptographic protocols can be viewed as a technical response to this loss of more traditional means of protecting ourselves.

While many proposals have been put forward to guide the transition to electronic commerce, most of these proposals provide for only simple transactions involving little negotiation or competition among buyers and sellers. In contrast, many financial vehicles, such as auctions, exchanges, and general markets, do not conform to this simplistic view of commerce. The transition to electronic commerce should not preclude such vehicles, but rather should make them more accessible. Such transition requires an effort to examine some of these financial vehicles to understand what is required to adequately implement them in electronic systems.

One example of financial vehicles is a sealed-bid auction. The sealed-bid auction is one in which secret bids are issued for an advertised item, and once the bidding period closes, the bids are opened and the winner is determined according to some publicly known rule (e.g., the highest bidder wins). Sealed-bid auctions are used, for example, in the auctioning of mineral rights to U.S. government-owned land, in the sale of artwork and real estate, and in the auctioning of government procurement contracts.

The study of sealed-bid auctions is motivated not only by their practical importance, but also by the novel security problems that they pose. First, central to the fairness of a sealed-bid auction is the secrecy of sealed bids prior to the close of the bidding period. That is, the timing of the disclosure of bids is crucial. Second, auctions require non-repudiation mechanisms to ensure that payment can be collected from winning bidders, as evidenced by the fact that in a recent FCC auction of interactive video and data service licenses, 13 winning bidders defaulted on their bids, forcing a second auction to be held. Third, due to secrecy requirements surrounding sealed-bid auctions, it may be difficult for outsiders to have confidence in the validity of the auction. Fourth, some types of sealed-bid auctions should enable bidders to remain anonymous. These problems are only exacerbated when one considers the implementation of auctions in distributed computer systems, or the possibility of a corrupt insider in the auction house collaborating with bidders.

It is therefore an object of this invention to provide a secure distributed auction service that supports the submission of monetary bids for an auction and ensures the validity of the outcome, despite the malicious collaboration of arbitrarily many bidders and fewer than one-third of the auction servers comprising the service. The auction service should address all of the security issues mentioned above. In particular, the auction service should guarantee to declare the proper winning bidder, and to collect payment in the form of digital cash from only that bidder. It should also be guaranteed that no bid is revealed prior to the close of the bidding period. Moreover, it should be possible for bidders to submit anonymous bids. The resilience of the auction service to malicious auction servers can be leveraged to provide resilience to malfeasant auction house insiders. If, for example, each individual is allowed access to fewer than one-third of the servers, then corrupting an insider provides no advantage to a bidder in the auction. This reduces the incentive for buying off insiders in the auction house.

It is also an object of this invention to provide an efficient and practical approach to performing auctions. For example, the approach should be feasible using off-the-shelf workstations for auction servers, even for large auctions involving hundreds of bids.

SUMMARY OF THE INVENTION

These and other objects of the invention are accomplished in accordance with the principles of the invention by providing secure and efficient integration of the range of old and new cryptographic techniques.

The secure auction system of the present invention provides an interface or bidding terminals by which clients or bidders can issue secret bids to the auction servers for an advertised auction. Once the bidding period is closed, the auction service opens the bids, determines the winning bid, and provides the winning bidder with a ticket for claiming the item bid upon. Using novel cryptographic techniques, the secure auction system is constructed to provide strong protection for both the auction house and correct bidders, despite the malicious behavior of any number of bidders and fewer than one-third of the servers comprising the secired auction system. Specifically, it is guaranteed that (i) bids of correct bidders are not revealed until after the bidding period has ended, (ii) the auction house collects payment for the winning bid, (iii) losing bidders forfeit no money, and (iv) only the winning bidder can collect the item.

Further features of the invention, its nature and various advantages will be more apparent from the accompanying drawings and the following detailed description of the preferred embodiments.

DETAILED DESCRIPTION OF THE PREFERRED EMBODIMENTS

The following Detailed Description begins with an overview of secure auction system, continues with a description of well-known primitives and a new cryptographic primitive used in the secured auction system of the present invention, then gives a detailed description of the protocol used in a preferred embodiment.

OVERVIEW OF THE INVENTION

Figure 1:
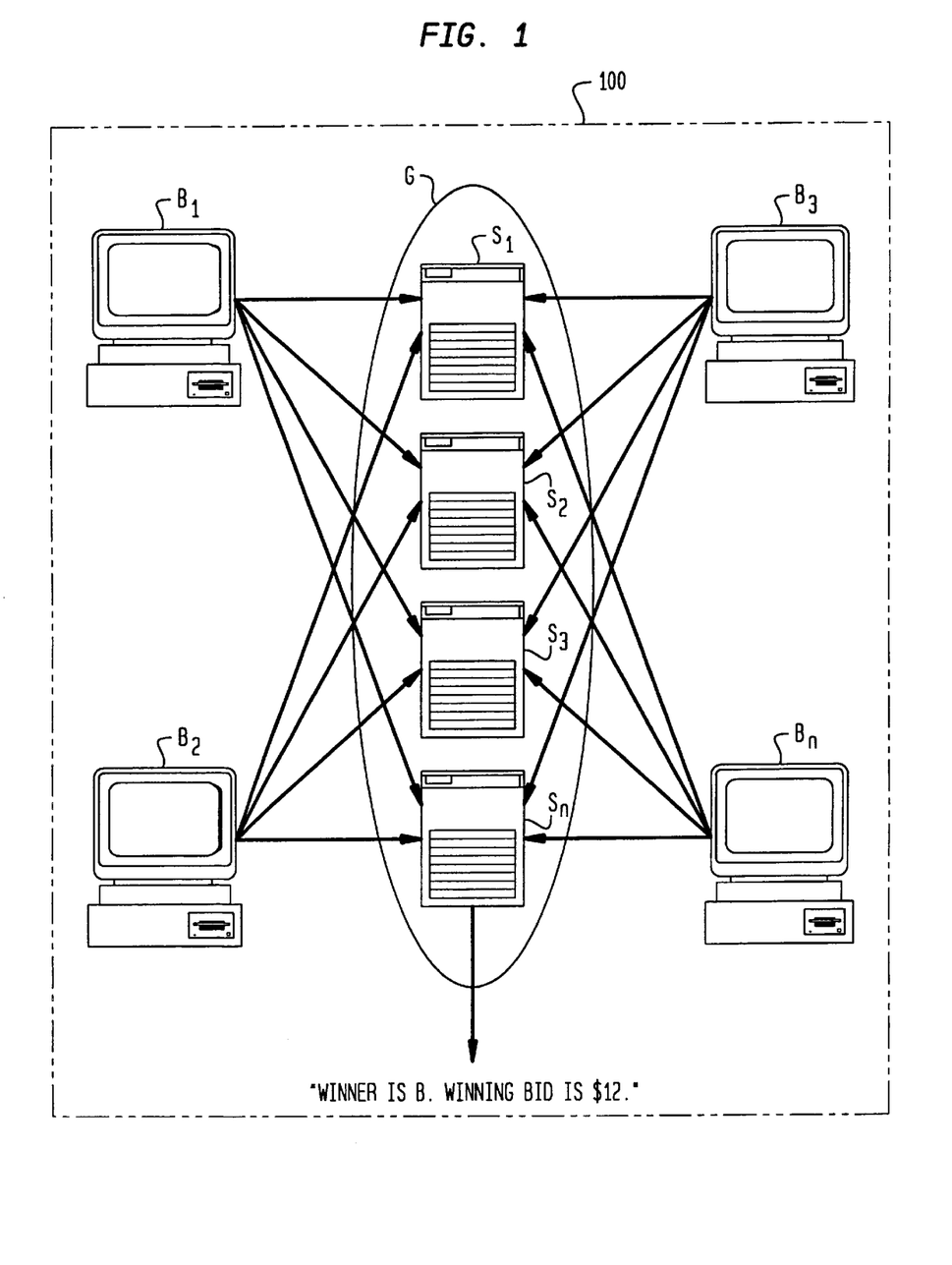
FIG. 1 is a simplified overview of illustrative system which can be operated in accordance with this invention.
Figure 2:
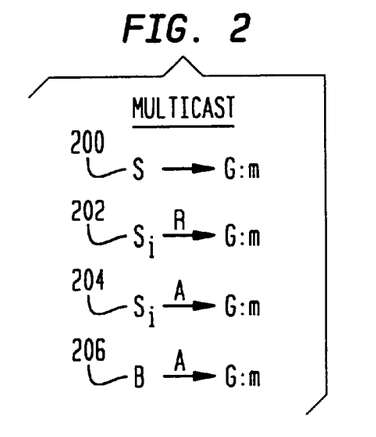
FIGS. 2–5 are lists of cryptographic notations which are employed in the present invention.

In the illustrative embodiment shown in FIG. 2, secure auction system 100 includes server group $G$ containing multiple servers $S_1$, $S_2$, $S_3$ and $S_n$, each connected to multiple bidding terminals $B_1$, $B_2$, $B_3$ and $B_n$. Secure auction system 100 allows transportation of data between server group 100 and geographically distributed multiple bidding terminals $B_1$, $B_2$, $B_3$ and $B_n$ via various communication links and switching processors. Secure auction system 100, for example, can be a network of moderately loaded SPARC$^{TR}$ stations, manufactured by Sun Computer, Inc.

A sealed-auction typically consists of two phases of execution. The first is a bidding period, during which many bidding terminals $B_1$, $B_2$, $B_3$ and $B_n$ can submit arbitrarily many sealed bids to auction server group $G$. At some point the bidding period is closed, thus initiating the second phase in which the bids are opened by server group $G$ and the winner is determined and possibly announced. The rule by which the winner is determined can be any publicly known, deterministic rule. The deterministic rule, for example, dictates that the highest bidder be chosen the winner.

There are numerous possibilities for corruption and misbehavior in the sealed-bid auction. Possibly the most difficult to counter are those that involve the misbehavior of insiders in charge of executing and overseeing auction server group 110 (e.g., employees of the auction house), especially when this behavior involves collaboration with certain bidders at bidding terminals $B_1$, $B_2$, $B_3$ and $B_n$. Below are several examples of behavior that could yield an improper auction, many of which may be very feasible in a naive electronic implementation of auctions: (1) Prior to the close of the bidding period, an insider having access to server group $G$ opens submitted bids and informs a collaborator of their amounts so the collaborator at one of bidding terminals $B_1$, $B_2$, $B_3$ and $B_n$ can submit a bid for the minimum amount needed to win the auction; (2) an insider in control of server group $G$ manipulates the closing time of the bidding period. For example, the insider attempts to prematurely close the bidding period in an effort to exclude some bids; (3) bids for one auction are diverted to a second auction with an earlier closing time, causing their amounts to be revealed prematurely to an insider at server group $G$; (4) after the close of the bidding period, a bidder at one of bidding terminals $B_1$, $B_2$, $B_3$ and $B_n$ arranges to withdraw a bid or insert a bid, in collaboration with an insider at server group $G$; (5) an insider having control of server group $G$ awards the auction item to someone other than the winning bidder (and goes undetected because bids are not made public); (6) an insider at server group $G$ collects payment from losing bidders (e.g., by informing each that it won), or collects payment from the winning bidder but fails to provide the means for that bidder to obtain the item bid upon; and (7) the winning bidder refuses to pay the auction house (e.g., by disclaiming the bid or claiming that it lacks sufficient funds).

It is worth noting that in a naive electronic implementation of a sealed-bid auction, some of the above problems could arise simply due to the benign failure of the auction service or a bidding process. For example, the problem of (6) could arise if the auction service is not fault-tolerant, collects money from the winning bidder, and then fails before granting the item to the bidder. Similarly, the problem of (7) could arise if a bidding process submits a bid and then fails.

Secure auction system 100 of the present invention prevents the above behaviors and most other "attacks" on auctions, despite the malicious behavior of arbitrarily many bidders and fewer than one-third of the auction servers comprising the service. We would find a process (bidder, server, etc.) to be correct if the process always follows the specified protocols. We describe the properties provided by secure auction system 100 in two categories, namely Validity properties and Secrecy properties.

The Validity properties include the following conditions. The bidding period eventually closes, but only after correct auction server group decides that it should be closed. There is at most one winning bid per auction, dictated by the (deterministic) publicly-known rule applied to the well-formed bids received before the end of the bidding period.

The auction server group $G$ collects payment from the winning bidder equal to the amount of the winning bid. Correct losing bidders forfeit no money. Only the winning bidder can collect the item bid upon.

The Secrecy properties include the following conditions. The identity of a correct bidder and the amount of its bid are not revealed to any party until after the bidding period is closed. In addition, our auction protocol can be modified to allow for the submission of anonymous bids.

PRELIMINARIES

In this section we review some primitives that are used in our auction protocol. Our protocols make essential use of well-known public and private key cryptographic tools where each of the designated parties receives the private key transmitted only to that particular party and also receives the public key to be shared with other parties in order to decrypt transmitted information. In secure auction system 100, the designated parties may be servers $S_1$, $S_2$, $S_3$ and $S_n$, each of which utilizes both private and public keys to decode and verify the transmitted bids using the auction protocol of this invention.

The cryptographic tools used in secure auction system 100 are notated as follows. The encryption of m with a public key K is denoted $<m>_K$, and the decryption of m with private key $K^{-1}$ is denoted $<m>^{K^{-1}}$. The digital signature of a message m by a process P (i.e., with P's private key) is denoted $\sigma_P(m)$.

Group multicast, threshold secret sharing schemes and electronic money are also introduced as primitives to secure auction system 100 of the present invention.

First, group multicast is a class of interprocess communication primitives by which messages can be multicast to a group $G$ of processes. Secure auction system 100 employs three types of group multicast primitives, namely unreliable, reliable, and atomic multicasts. Each of these multicast primitives enables a process $S \in G$ to multicast a message to the members of $G$. For example each of bidding terminals $B_1$, $B_2$, $B_3$ and $B_n$ multicasts its bidding information to serves $S_1$, $S_2$, $S_3$ and $S_n$ contained in server group $G$.

The weakest of these multicast primitives is unreliable multicast. Referring to FIG. 2, the unreliable multicast of a message m from a process $S \in G$ to the group $G$ is denoted by 200. Unreliable multicast provides the property that if S is correct, then all correct members of $G$ receive the same sequence of unreliable multicasts from S, which is the sequence of unreliable multicasts initiated by S. In particular, unreliable multicasts are authenticated and protect the integrity of communication. However, no guarantees are made regarding unreliable multicasts from a faulty S.

The second multicast primitive is called reliable multicast, also known as "Byzantine agreement". Referring to FIG. 2, the reliable multicast of message m from a process $S \in G$ to the group $G$ is denoted by 202. Reliable multicast provides all of the properties of unreliable multicast. In addition, it strengthens these properties by ensuring that for each $S \in G$, all correct members of $G$ receive the same sequence of reliable multicasts from S, regardless of whether S is correct or faulty. However, reliable multicasts from different members can be received in different orders at each member of Ğ.

The third and strongest multicast primitive is atomic multicast. Referring to FIG. 2, the atomic multicast of message m from a process S ∈ Ğ to the group Ğ is denoted by 204. Atomic multicast provides all of the guarantees of reliable multicast, and strengthens them by ensuring that all correct members of Ğ receive the same sequence of atomic multicasts regardless of their senders.

Because processes executing our auction protocol must sometimes block awaiting the receipt of reliable or atomic multicasts, it is necessary to provide some degree of failure detection to guarantee progress in the case that a faulty member does not multicast a message on which others are waiting. Moreover, correct group members must concur on the set of messages multicast by such a member prior to its failure. The reliable and atomic multicast protocols that we have implemented provide these properties.

In addition to multicasts from within a process group, the auction protocol of the present invention also requires the ability for any arbitrary process B ∉ Ğ to atomically multicast messages to Ğ. Referring to FIG. 2, such multicast of a message m is denoted by 206. Atomic multicasts from outside the group are provided the same total ordering guarantee as those from within the group. That is, all correct members of Ğ receive the same sequence of atomic multicasts, regardless of the origin of those multicasts. However, unlike atomic multicasts from within the group, atomic multicasts from outside the group are not authenticated, but rather are anonymous where multicasted messages do not indicate their senders. Moreover, failure detection of processes outside the group is not provided.

The multicast protocols that we have implemented can tolerate the failure of t members of a group of size n (and any number of non-member failures) provided that $n \geq 3t+1$. More precisely, our multicast protocols, which employ timeouts in their methods for failures detection, satisfy the stated specifications despite t failures in a group of size $3t+1$ provided that messages from correct members induced timeouts in other correct members sufficiently infrequently.

Second, a (t, n)-threshold secret sharing scheme is, a well-known method of breaking a secret s into n shares $sh_1(s), \ldots, sh_n(s)$, so that $t+1$ shares are sufficient to reconstruct s but t or fewer shares yield no information about s. In a polynomial based secret sharing scheme, the secret s is an element of a finite field F and the ith share is $sh_i(s)=f(i)$, where $f(x)$ is a degree t polynomial such that $f(0)=s$ and such that the other coefficients are chosen uniformly at random from F. Interpolation of any $t+1$ shares reconstructs $f(x)$ and hence the secret s. F is typically taken to be the integers modulo p for some prime p larger than the secret. This scheme works for any threshold $t<n$.

If the results obtained by applying a public one-way function to each share are known, a process attempting to reconstruct the secret can verify that a share has not been altered prior to using it in reconstruction. In this way, the alteration of up to $n-t-1$ shares can be tolerated. The auction protocol of the present invention makes use of this observation.

Third, an electronic money or "digital cash" scheme is a set of cryptographic protocols for (i) a customer to withdraw electronic money from a bank, (ii) the customer to use the money to purchase something from a vendor, and (iii) the vendor to deposit the money in its account with the bank. These protocols protect the security interests of the parties involved, by ensuring that the customer's identity cannot be linked to the purchase, that each party accepts only valid electronic money, and that the customer cannot undetectably reuse or forge money.

A money scheme is said to be "off-line" if the purchase protocol does not involve the bank; otherwise the scheme is said to be "on-line." In a typical on-line scheme, the vendor queries the bank to determine whether the "coin" that a customer is attempting to use in a purchase has already been spent. In an off-line scheme, the bank is not consulted during purchases, and hence reuse cannot be prevented. However, the customer's identity can be embedded in each coin in a way that is accessible if and only if the same coin is used for more than one purchase. When the copies are eventually deposited, the bank will learn the identity of the reuser. In the preferred embodiment, off-line cash schemes are considered primarily.

In stating our protocol based on off-line cash scheme, we abstract away the implementation of digital cash used, and simply describe a digital coin as consisting of a triple $<v_\$, \sigma_{bank}(v_\$), w_\$>$, where $v_\$$ is a description of the coin, $\sigma_{bank}(v_\$)$ is the signature of the bank on that description, and $w_\$$ is some auxiliary information that must accompany the coin when it is used in a purchase. The description $v_\$$ would typically include the value of the coin, and an embedding of the customer's identity as described above. The auxiliary information $w_\$$ would typically be a "hint," any two of which enable the extraction of the embedded identity, and would include certain freshness information, such as time or date so that a vendor can detect the replay of a coin. Our auction protocol requires that the procedure for a vendor to determine the validity of $v_\$$ and $w_\$$ be a deterministic function of these values that it can compute locally.

VERIFIABLE SIGNATURE SHARING

In addition to the primitives reviewed in the above section, the auction protocol of the present invention employs a new cryptographic primitive for protecting digital signatures, called verifiable signature sharing ("VΣS").

VΣS enables the holder of a digitally signed message, who need not be the original signer, to share the signature among a group of processes so that the correct group members can later reconstruct it. At the end of the sharing phase, each member can verify whether a valid signature for the message can be reconstructed, even if the original signature holder and/or some of the members are malicious. In addition, malicious members gain no information prior to reconstruction about the signature held by a correct sharer.

VΣS has applications whenever a signed document should become valid only under certain conditions (e.g., a will, a springing power of attorney, or an exchange of contracts). Verifiably sharing the document's signature among a group of processes, with "trigger" instructions, ensures that the signature will not be released until the correct members believe that the triggering events have occurred.

Simple and efficient VΣS schemes for signature schemes are developed based on the discrete logarithm problem, including, for example, ElGamal, Schnorr, and the Digital Signature Algorithms as discussed in a greater detail below. Sharing requires a single group multicast from the signature holder to the group of processes among which the signature is to be shared, followed by a single round of multicasts among the group members. Reconstruction requires no interaction, beyond a single message sent from each member to the process performing the reconstruction. Our protocols tolerate a malicious sharer and t malicious members in a group of size $n \geq 3t+1$. Our protocols for ElGamal and Schnorr signatures ensure the secrecy of the signature in a strong sense; others provide only a weaker, heuristic notion of secrecy.

Figure 3:
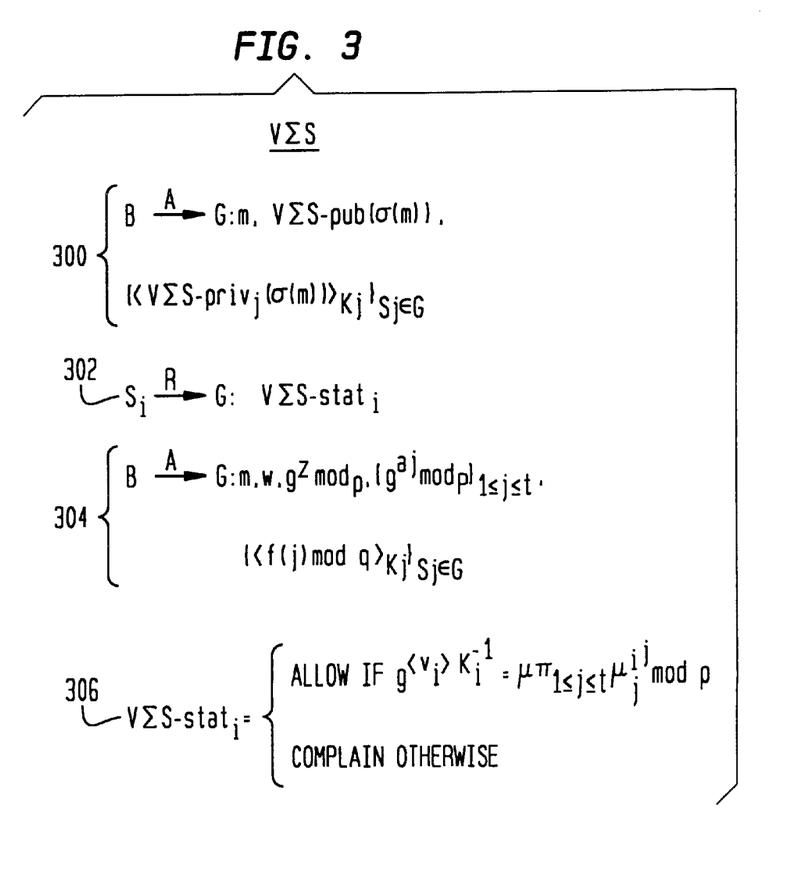

The choice of VΣS scheme for auction protocol depends on the signature scheme used by the bank to sign its digital cash. For generality, here we describe VΣS in an abstract form. If B holds a signature σ(m) of a message m (i.e., $\sigma(m)=\sigma_p(m)$ for some P), then B begins the VΣS protocol by generating two types of values from σ(m): a public value VΣS-pub(σ(m)) and, for each process $S_i$ in the group G among which the signature is to be shared, a private value VΣS-priv$_i$(σ(m)). B then atomically multicasts VΣS-pub(σ(m)) to the group members and communicates VΣS-priv$_i$(σ(m)) to $S_i$ privately, say, encrypted under the public key $K_i$ for $S_i$. Referring to FIG. 3, such multicast is denoted by 300. Alternatively, a weaker multicast may be used.

Upon receipt of such an atomic multicast 300, $S_i$ performs a local computation to determine whether the ith private value (which it decrypts with $K_i^{-1}$) is consistent with the public value. $S_i$ reliably multicasts the status of this computation, denoted VΣS-stat$_i$, to the group as denoted by 302 in FIG. 3.

Finally, once $S_i$ has received a reliable multicast from $S_j$ (or detected $S_j$ faulty) for each $S_j \in G$, it performs a local computation that allows it to either accept or reject the attempt to share σ(m). This local computation is a deterministic function of the reliably and atomically multicast values only, and so either all correct group members accept or all correct members reject. If they accept, then this guarantees that σ(m) can be reconstructed with the information they collectively possess. If σ(m) was shared correctly, then the correct members will accept, but faulty members gain no information about σ(m). If at some point the correct members choose to reconstruct σ(m), they can do so by each member $S_i$ forwarding its private value VΣS-priv$_i$(σ(m)) (and possibly some other auxiliary information) to the reconstructing party, which can then easily reconstruct the signature.

As an example of a VΣS scheme, here we outline the VΣS scheme for Schnorr which relies on techniques of verifiable secret. For a Schnorr signature, the public key is g, p, q, y where p is a large prime, q is a large prime factor of p−1, g has order q in $Z^*_p$, and $y=g^x$ mod p for some x. The private key is x. The signature of a document m is given by σ(m)=[w,z] where $w=h(g^r$ mod p,m) for random $r \in Z_q$ and message digest function h, and where z=wx+r mod q. The signature can be publicly verified by checking that $w=h(g^z y^{-w}$ mod p,m).

To share σ(m) to a group $G=\{S_i, \ldots, S_n\}$, the sharer B chooses values $a_1, \ldots, a_t$ at random from $Z_q$. Then B lets VΣS-pub (σ(m))=$\{w, g^z$ mod p, $g^{a_1}$ mod p, $\ldots, g^{a_t}$ mod p$\}$, and VΣS-priv$_j$ (σ(m))=f(j) mod q, where . . . , $f(x)=z+a_1 x+ \ldots +a_t x^t$. That is B executes the multicast denoted by 304 in FIG. 3.

Now suppose that $S_i$ receives an atomic multicast of the form $$m, w, u, \{u_j\}_{1 \leq j \leq t}, \{v_j\}_{S_j \in G}$$

for some values of m, w, u, $\{u_j\}_{1 \leq j \leq t}$, and $\{v_j\}_{S_j \in G}$. $S_i$ computes VΣS-stat, as denoted by 306 in FIG. 3.

$S_i$ reliably multicasts VΣS-stat$_i$ and collects status values from the other servers. Finally, $S_i$ accepts if $w=h(uy^{-w}$ mod p, m) and at most t processes complained.

THE AUCTION PROTOCOL OF THE PRESENT INVENTION

Auction system 100 is constructed using auction group G having n auction servers, $S_1, S_2, S_3$ and $S_n$. There is a parameter t that defines the fault tolerance of the service, i.e., the maximum number of servers that can fail without affecting the correctness of the service. Our protocol requires that $n \geq 3t+1$. A bidder submits a bid of a certain value to the service by sharing the pieces of a digital coin $<v_\$, \sigma_{bank}(v_\$), w_\$>$ with that value among auction servers group G. The description $v_\$$ and auxiliary information $w_\$$ are shared with a standard (t,n)-threshold secret sharing scheme, while the signature $\sigma_{bank}(v_\$)$ is shared with a VΣS scheme. Once the bidding period has closed, the servers $S_1$, $S_2$, $S_3$ and $S_n$ in server group G reconstruct $v_\$$ and $w_\$$ for each bid received during the bidding period, and then perform the VΣS protocol to determine acceptance or rejection for each bid (i.e., to determine if they collectively possess $\sigma_{bank}(v_\$)$). Server group G then choose the winning bid from the acceptable bids and declare the winner. Finally, subject to auction house controls, the bank's signature on the coin in the winner's bid can be reconstructed via the VΣS scheme, and the coin can be deposited. The secrecy of each bid is ensured until after bidding is closed because correct servers do not cooperate in the reconstruction of $v_\$$ and $w_\$$ until after bidding is closed. Moreover, since $\sigma_{bank}(v_\$)$ is never reconstructed for a losing bid, the coins in losing bids cannot be spent by faulty servers.

The auction protocol of the present invention summarized in the above paragraph is described in greater detail hereafter in this section. The n auction servers, denoted by $S_1, S_2, S_3$ and $S_n$ are organized as a process group G to which processes can multicast messages (unreliably, reliably, or atomically). Associated with each server $S_i$ is a public key $K_i$ for use in a deterministic public key cryptosystem. Each $K_i$ is assumed to be available to all servers $S_1, S_2, S_3$ and $S_n$ and bidding terminals $B_1, B_2, B_3$ and $B_n$; the corresponding private key $K_i^{-1}$ is known only to $S_i$. In addition, we assume that a global identifier aid for the auction is known by all servers and bidders. In the description below, ∥ denotes concatenation. Only multicasts from servers $S_1, S_2, S_3$ and $S_n$ are authenticated, and sh$_i$(s) denotes the ith share of s produced via Shamir's (t,n)-threshold secret sharing scheme.

1. Submitting A Bid

Figure 4:
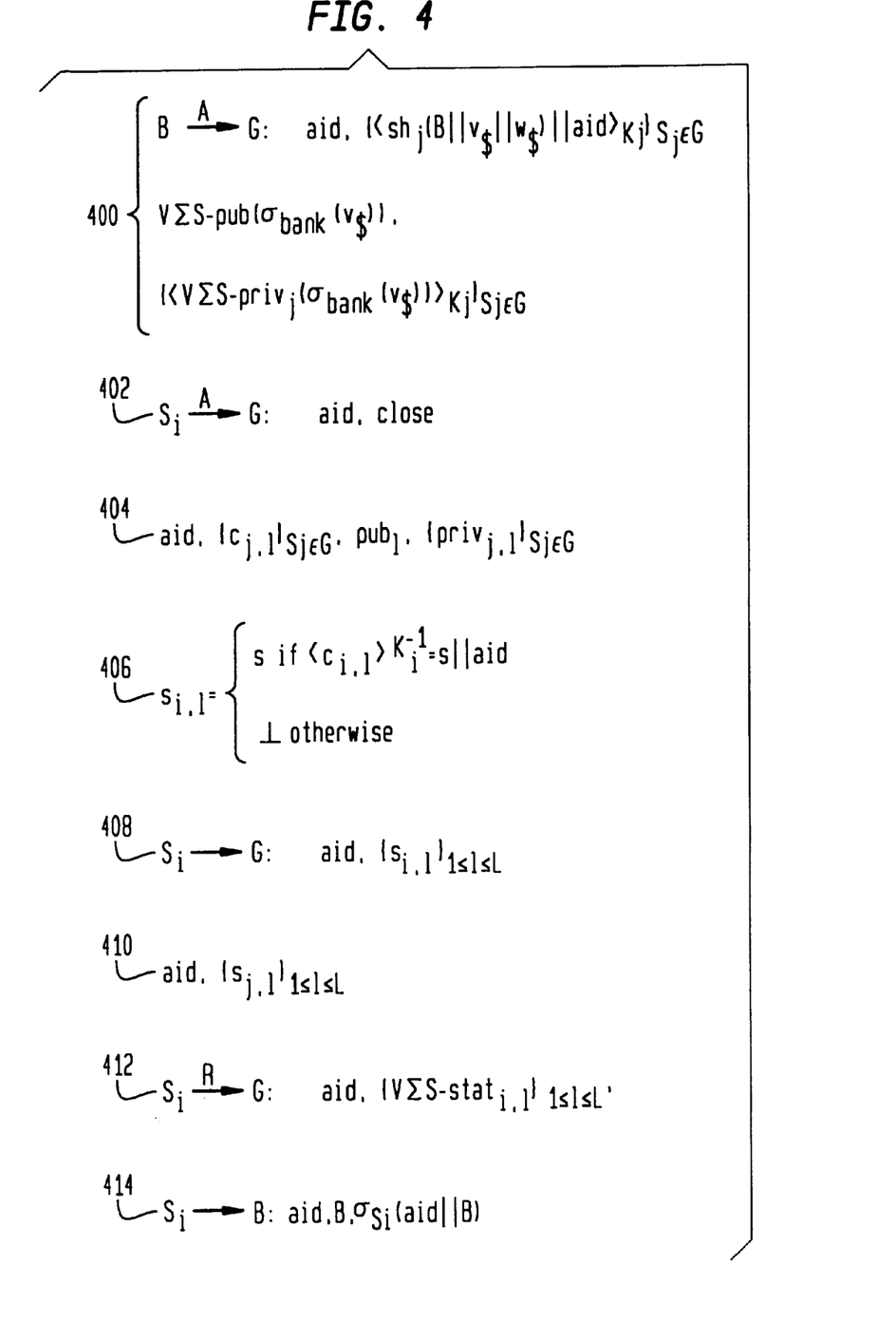

Suppose a bidder wishes to submit a bid to the auction. Without loss of generality, we assume that the bidder possesses a digital coin $<v_\$, \sigma_{bank}(v_\$), w_\$>$ in the amount of the desired bid. The freshness information included in $w_\$$ is aid. Referring to FIG. 4, the bidder at bidding terminal B submits the bid using a single atomic multicast as denoted by 400.

2. Closing The Bidding Period

When server $S_i$ decides that bidding should be closed, it executes the multicast denoted by 402 to atomically multicast close messages. When $S_i$ has received (by atomic multicast) close messages for auction aid from t+1 different servers, it considers bidding closed and ignores any bids subsequently received. By the properties of atomic multicast, all correct servers, i.e. t+1 servers, will agree on the set of bids for auction aid received prior to closing.

The identity of the bidder and the amount of the bid are not revealed until after the bidding period is closed at some correct server. This prevents bids being submitted based on the previously disclosed contents of other bids, because by the properties of atomic multicast, once bidding is closed at any correct server, the set of bids that will be considered by any correct server is fixed.

3. Opening The Bids

Suppose that the l.h. bid for auction aid received (by atomic multicast) at $S_i$ is of the form as denoted by 404 for some values of $\{c_{j,l}\}_{S_j \epsilon G}$ pub$_j$, and $\{priv_{j,l}\}_{S_j \epsilon G}$. Also suppose that a total of L bids were received for auction aid. These bids are basically decrypted shares of the whole information about the original bids and subsequently opened in three steps:

First, for each $1, 1 \leq l \leq L$, server $S_i$ computes the equation denoted by 406. $S_i$ then executes the multicast denoted by 408. This step allows multicasting received shares to each other.

Second, when $S_i$ receives a message of the form as denoted by 410 from a server $S_j$, it verifies for each $1, 1 \leq l \leq L$, that if $s_{j,l} \neq \perp$, then $<s_{j,l}\|aid>_{Kj} = C_{j,l}$. If there is an l for which this does not hold, then $S_i$ discards and ignores this message from $S_j$. Note that if this occurs, then $S_j$ must be faulty. This step verifies consistency of each share with decrypted text of corresponding bid.

Third, $S_i$ completes the opening of the l.h. bid, $1 \leq l \leq L$, as follows. If in the first 2t+1 messages of the form (+) that $S_i$ receives (from different servers, and that pass the verifications of step 2), there are t+1 messages, say from $S_j, \ldots, S_{jt+1}$, such that $s_{jk,l} \neq \perp$ for all k, $1 \leq k \leq +1$, then $S_i$ finds the degree t polynomial $f_1$ determined by $S_{j1,l} \ldots S_{j+1,l}$. If $<f_l(j)\|aid>_{Kj} \neq c_{j,l}$ for any j, $1 \leq j \leq n$, then $S_i$ discards the l.h. bid. $S_i$ also discards the l.h. bid if $f_l(0)$ is not of the form $B_l\|v_{\$,l}\|w_{\$,l}$ for some $B_l$, $v_{\$,l}$, and $w_{\$,l}$ of a proper syntactic form, or if in the first 2t+1 messages of the form (+) that $S_i$ receives, there are t+1 messages, say from $S_{j1}, \ldots, S_{jt+1}$, such that $S_{jk,l} = \perp$ for all k, $1 \leq k \leq t+1$. Note that if the l.h. bid is discarded, then it was submitted by a faulty bidder. This step allows verifying consistency of all of the shares with each other for each bid.

4. Checking The Validity Of Bids $S_i$ checks the validity of the remaining bids as follows.

First, for each remaining bid, $S_i$ first performs the validity checks on $v_\$$ and $w_\$$ that are dictated by the electronic money scheme in use, discarding any bid that is found to be invalid or a replay. By the properties of the off-line cash scheme and the choice of freshness information embedded in $w_\$$, these tests involve only local deterministic computations. Let the remaining bids be renumbered $1 \leq l \leq L^1$.

Second, $S_i$ computes VΣS-stat$_{i,l}$ (from $(priv_{i,l})^{Ki-1}$ and pubs for each $1, 1 \leq l \leq L^1$, according to the VΣS scheme, and executes the multicast denoted by 412. $S_i$ collects reliable multicasts from the other servers and determines acceptance or rejection for each remaining bid according to the VΣS scheme. All rejected bids, for example, any bad $S_j \neq \perp$ provided by a faulty $S_j$ are discarded.

5. Declaring The Winner

Server $S_i$ chooses the winning bid from among the remaining bids first by agreeing on the set that pass the validity check and then by following the public rule for determining the winner. Once the winning bidder at bidding terminal B is determined, $S_i$ executes the multicast denoted by 414 where ⇢ denotes a point-to-point send over a (not necessarily authenticated) communication channel. This message conveys that $S_i$ declares bidder at bidding terminal B the winner of auction aid. Such messages from t+1 servers, i.e., all correct servers, can collectively serve as winning bidder's ticket for claiming the auctioned item. Therefore, only the winning bidder obtains t+1 signed declarations (from t+1 different auction servers) stating that it won the auction and only the winning bidder can collect the item bid upon, supposing that possession of t+1 such declarations is necessary to do so.

At this point, correct servers can erase any information they hold for losing bids. By the properties of the VΣS scheme, the correct servers possess enough information to reconstruct the bank's signature for the coin used in the winning bid. We caution against the servers reconstructing this signature among themselves, lest a faulty server reconstruct and deposit the coin in its own account before the correct servers can deposit the coin in the auction's account. Moreover, enabling faulty servers to reconstruct the coin's signature might allow them to frame a bidder for reusing the coin, if the bidder does not take recommended precautions. Since the reconstruction and deposit of the coin can occur at any time after the auction (e.g., at the end of the day), a range of manual and/or electronic procedures are possible for performing these operations safely. A particularly convenient solution would be for each server to forward its private VΣS value for that coin's signature to the bank, so that the bank can perform the reconstruction itself.

The auction servers group G collects payment from the winning bidder equal to the amount of the winning bid. By the properties of the VΣS scheme, the correct servers end the protocol in possession of shares sufficient to reconstruct the bank's signature on the coin contained in the winning bid. This signature can be reconstructed via the VΣS reconstruction protocol, according to auction house policy.

The money from a losing bid is worthless without the bank's signature. By the properties of VΣS, no information about this signature is leaked to a coalition of faulty servers, and so the faulty servers are unable to deposit the money. Thus, the money is effectively transferred back to the bidder, who can reuse the money as it chooses.

A goal of most approaches to electronic money is to provide anonymous spending to customers, i.e., to prevent a vendor or bank from associating purchases to individuals. As a further feature to the preferred embodiment, we discuss the ability of a bidder to retain that anonymity in the auction protocol.

A first requirement to achieving bidder anonymity is to remove the identity of the bidder at bidding terminals $B_1$, $B_2$, $B_3$ and $B_n$ from the auction protocol of the preferred embodiment. A simple approach to achieve this is for each bidder, prior to submitting a bid, to generate a large random number r and use h(r) as a pseudonym for that bid, where h is a message digest function. That is, a bid would be submitted in a multicast as denoted by 500 in FIG. 5.

Figure 5:
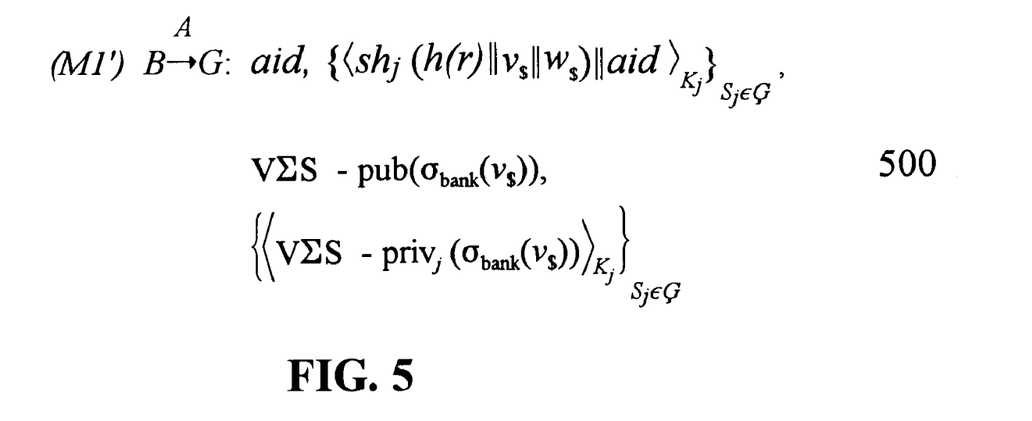

The auction would then proceed as before, except that the winner would be announced by $S_i$ as follows:

$$aid, h(r), \sigma_{Si}(aid, h(r))$$

Note that $S_i$, not knowing the identity or location of the bidder that submit the bid with pseudonym h(r), must simply broadcast the declaration of the winner. Alternatively, $S_i$ could place this signed declaration in a location from which it could be later retrieved by the winning bidder. The winner can employ t+1 such declarations and the number r, which only it knows, as its ticket for claiming the auctioned item.

While at first this may seem to ensure the bidder's anonymity, other steps may be required due to the properties of off-line digital cash. As discussed before, off-line cash schemes require that the customer's (in this case, the bidder's) identity be embedded within the value $v_\$$ in a way that reveals this identity to the bank if the same coin is spent multiple times. Thus, with proposed off-line cash schemes, if a bidder were to submit the same coin to two auctions (e.g., submit the coin to one, lose the auction, and submit the coin to another), then the identity of the bidder could be inferred by a coalition of one faulty auction server from each auction. Perhaps even worse, if $\sigma_{bank}(v_\$)$ is ever leaked to the coalition of faulty servers (e.g., due to a weakness in the procedures by which the coin is reconstructed and deposited after it wins the second auction), then they could deposit both uses of the coin, thereby revealing the bidder's identity to the bank and "framing" the bidder for reusing the coin. It is possible to modify proposed off-line cash schemes so that the identity information embedded in $v_\$$ is encrypted with a key known only to the bank and the bidder. Then, the bank's cooperation would be required to reveal the identity of the bidder. However, this approach still enables the coalition of auction servers to link the same coin, and thus the same (unknown) bidder, to both auctions, and does not prevent the "framing" attack described above.

There are steps that a bidder should take to guard against these attacks. Specifically, the bidder should use a coin in at most one bid. If that bid is unsuccessful, the bidder should deposit the coin in the bank and withdraw a new one. In this case, multiple bids cannot be linked to the same bidder or used to frame the bidder for reuse, and the identity of the bidder can be revealed only by a coalition involving the bank and a faulty auction server. However, it is not clear how a bidder can conceal its identity against such a coalition with current off-line schemes.

The preferred embodiment of the present invention provides the design and implementation of a practical distributed auction service that can tolerate the malicious behavior of fewer than one-third of its servers and any number of bidders. Our design of auction system 100 is based on several cryptographic primitives, both old (multicast, secret sharing, digital cash) and new (verifiable signature sharing). The implementation of this service suggests that this approach performs sufficiently well to be useful in a wide range of settings.

This work is part of a larger effort to understand how to implement common financial vehicles in distributed systems. The techniques developed in this work can be extended to address more general types of auctions and other financial vehicles.

It will be understood that the foregoing is only illustrative of the principles of the invention and that various modifications can be made by those skilled in the art without departing from the scope and spirit of the invention. For example, it is conceivable that the distributed protocols of the present invention could be modified to accommodate the use of on-line digital cash. The distributed protocol may also be used in a promissory bidding where an auction service accepts bids containing cash for only a portion of the bid amount as a good faith. Also the distributed protocol may be modified to apply cryptographic techniques called mental games where values of the bids are never disclosed even after bidding closes. To reiterate, some specific examples of possible uses of the invention include many common financial vehicles.

The invention claimed is:

1. A method for making transactions in a secure auction service network having a plurality of servers connected to a plurality of bidding terminals, said transaction being subject to a distributed protocol, said method comprising:

submitting from said bidding terminals monetary bids and distributing each of said monetary bids among said servers during a bidding period subject to a distributed protocol;

closing said bidding period;

verifying at said servers validity of monetary value of each of said monetary bids by utilizing said distributed protocol;

collectively determining a winning bidding terminal among said plurality of bidding terminals;

wherein said distributed protocol requires that said monetary bids be encoded using public information and private keys for distribution to said servers;

wherein said distributed protocol requires that said encrypted monetary bids be individually distributed in shares among said servers; and wherein said distributed protocol requires that said servers validate said monetary bids by decrypting said encrypted monetary bids using said private keys and evaluating the consistency with said public information.

2. The method as defined in claim 1, further comprising the step of determining a set of said monetary bids that pass said verifying step prior to said determining step.

3. The method as defined in claim 1, wherein said determining step follows a public auction service rule.

4. The method as defined in claim 1, wherein said bid is made with a digital coin, said digital coin is characterized by $<v_\$, \sigma_{bank}(v_\$), w_\$>$ where $v_\$$ is a description, $\sigma_{bank}(v_\$)$ is a digital signature and $w_\$$ is auxiliary information.

5. The method as defined in claim 4, wherein said description $v_\$$ and said auxiliary information $w_\$$ are shared among said servers with a standard (t,n) threshold secret sharing scheme and wherein said digital signature $\sigma_{bank}(v_\$)$ is shared among said servers with a verifiable signature sharing VΣS scheme.

6. The method as defined in claim 5, wherein said verifying step comprises:

reconstructing said description $v_\$$ and said auxiliary $w_\$$; and performing said verifiable signature sharing VΣS scheme to determine said validity of each of said monetary bids.

7. The method as defined in claim 6, wherein said performing step comprises the step of determining if said servers collectively possess said digital signature $\sigma_{bank}(v_\$)$.

8. The method as defined in claim 5, further comprising the steps of:

reconstructing said digital signature $\sigma_{bank}(v_\$)$ of said winning bid via said VΣS scheme; and depositing said digital coin.

9. The method as defined in claim 5, further comprising the step of accompanying said description $v_\$$ includes identity of said bidding terminal in the form of a pseudonym.

10. The method as defined in claim 5, further comprising the steps of:

encoding identity of said bidding terminal into a pseudonym prior to said submitting step; and decoding said pseudonym into identity of said bidding terminal of said winning bid after said determining step.

11. A method for making transactions in a service network having a plurality of servers and a plurality of remote stations connected to said servers, said transactions being subject to distributed protocols, said method comprising:

submitting offers from said remote stations to said servers by:

i. encoding each of said offers into a plurality of shares utilizing said distributed protocols;

ii. individually distributing said shares of each of said offers among said servers;

reconstructing at said servers portions of said offers by utilizing said distributed protocol;

verifying collectively among said servers the validity of said portions of said offers;

accepting collectively among said servers at least one of said verified offers based on a predetermined rule;

wherein said distributing step includes the steps of sending public information to said servers and sending private keys to appropriate servers; and wherein said verifying step includes the step of evaluating consistency of said decrypted share with said public information.

12. The method as defined in claim 11 further comprising reconstructing said at least one accepted offer.

13. The method as defined in claim 11, wherein said verifying step is based on a verifiable signature sharing V$\Sigma$S scheme.

14. A secure auction system for making transactions subject to distributed protocol comprising:

a plurality of bidding terminals configured for submitting monetary bids and individually distributing said monetary bids among a plurality of servers connected to said bidding terminals during a bidding period;

said servers configured for closing said bidding period, for collectively verifying a validity of monetary value of each of said monetary bids by utilizing said distributed protocol and for collectively determining a winning bidding terminal;

wherein said bidding terminals encode said monetary bids using public information and private keys; and wherein said servers verify said monetary value of each of said monetary bids by decrypting said monetary bids with said private keys and evaluating the consistency with said public information.

15. The secure auction system as defined in claim 14, wherein said servers are configured for agreeing on a set of said verified monetary bids prior to determining said winning bidding terminal.

16. The secure auction system as defined in claim 14, wherein said servers are configured for reconstructing said monetary bid from said winning bidding terminal.

17. The secure auction system as defined in claim 14, wherein said monetary bids includes identity of said bidding terminal.

* * * * *